US007895271B1

(12) United States Patent
Malik

(10) Patent No.: US 7,895,271 B1
(45) Date of Patent: Feb. 22, 2011

(54) METHOD AND APPARATUS FOR MANAGING AND COMPACTING ELECTRONIC MAIL MESSAGES

(75) Inventor: Dale W. Malik, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1972 days.

(21) Appl. No.: 09/750,138

(22) Filed: Dec. 29, 2000

(51) Int. Cl.
*G06F 15/16* (2006.01)

(52) U.S. Cl. ...................... 709/206; 709/247

(58) Field of Classification Search ............... 709/206, 709/224, 226, 229, 232, 246, 247; 707/101; 341/60; 708/203
See application file for complete search history.

(56) References Cited

U.S. PATENT DOCUMENTS 5,051,745 A * 9/1991 Katz ....................... 341/51
5,136,291 A * 8/1992 Teague ..................... 341/83

(Continued)

FOREIGN PATENT DOCUMENTS

EP 1160704 A2 * 12/2001

(Continued)

OTHER PUBLICATIONS

Thomas, B.; "E-mail attachments: finding the right fit" Internet Computing, IEEE , vol. 1 , Issue: 3 , May-Jun. 1997 pp. 78-79.*

(Continued)

*Primary Examiner*—George C Neurauter, Jr.
(74) *Attorney, Agent, or Firm*—Thomas, Kayden, Horstemeyer & Risley, LLP

(57) ABSTRACT

A system and method for managing and compacting electronic mail messages to preserve storage space on a computer and to enhance the efficiency of an electronic mail application. A user or electronic mail system administrator may define a screening criteria to identify messages to be compacted according to compacting procedures. Compacting procedures may include compressing the message and attachments, detaching the attachments from the message and inserting references or pointers in place of the attachments in the message.

29 Claims, 5 Drawing Sheets

U.S. PATENT DOCUMENTS

| | | | | |
|---|---|---|---|---|
| 5,732,214 | A | * | 3/1998 | Subrahmanyam ............ 709/227 |
| 5,781,901 | A | * | 7/1998 | Kuzma ........................ 707/10 |
| 5,903,723 | A | * | 5/1999 | Beck et al. ................. 709/200 |
| 5,923,846 | A | * | 7/1999 | Gage et al. ................. 709/213 |
| 5,948,058 | A | * | 9/1999 | Kudoh et al. ................ 709/206 |
| 6,009,462 | A | * | 12/1999 | Birrell et al. ................ 709/206 |
| 6,052,812 | A | * | 4/2000 | Chen et al. ................. 714/751 |
| 6,178,461 | B1 | * | 1/2001 | Chan et al. ................. 709/247 |
| 6,275,848 | B1 | * | 8/2001 | Arnold ........................ 709/206 |
| 6,275,850 | B1 | * | 8/2001 | Beyda et al. ................ 709/206 |
| 6,317,751 | B1 | * | 11/2001 | Yeger et al. .............. 707/104.1 |
| 6,356,937 | B1 | * | 3/2002 | Montville et al. ........... 709/206 |
| 6,397,259 | B1 | * | 5/2002 | Lincke et al. ............... 709/236 |
| 6,417,930 | B2 | * | 7/2002 | Mori ........................ 358/1.15 |
| 6,421,707 | B1 | * | 7/2002 | Miller et al. ................ 709/206 |
| 6,449,658 | B1 | * | 9/2002 | Lafe et al. ................... 709/247 |
| 6,505,236 | B1 | * | 1/2003 | Pollack ....................... 709/200 |
| 6,549,957 | B1 | * | 4/2003 | Hanson et al. ................. 710/5 |
| 6,609,138 | B1 | * | 8/2003 | Merriam ..................... 707/204 |
| 6,678,705 | B1 | * | 1/2004 | Berchtold et al. ........... 707/204 |
| 6,684,088 | B1 | * | 1/2004 | Halahmi ..................... 455/566 |
| 6,697,844 | B1 | * | 2/2004 | Chan et al. ................. 709/206 |
| 6,725,228 | B1 | * | 4/2004 | Clark et al. ................. 707/102 |
| 6,728,785 | B1 | * | 4/2004 | Jungck ....................... 709/247 |
| 6,826,609 | B1 | * | 11/2004 | Smith et al. ................. 709/225 |
| 6,842,768 | B1 | * | 1/2005 | Shaffer et al. ................ 709/203 |
| 6,879,988 | B2 | * | 4/2005 | Basin et al. ................. 707/200 |
| 2002/0120639 | A1 | * | 8/2002 | Basin et al. ................. 707/204 |

FOREIGN PATENT DOCUMENTS

WO      WO 0221790 A2 * 3/2002

OTHER PUBLICATIONS

Chan, M.C.; Woo, T.Y.C.; "Application of compaction technique to optimizing wireless email transfer" Wireless Communications and Networking Conference, 1999. WCNC. 1999 IEEE , Sep. 21-24, 1999 pp. 1533-1537 vol. 3.*

Nand, A.; Tong Lai Yu; "Mail servers with embedded data compression mechanisms" Data Compression Conference, 1998. DCC '98. Proceedings , Mar. 30-Apr. 1, 1998 pp. 566.*

Postel, Jonathan B. "Simple Mail Transfer Protocol" Aug. 1982. RFC 821. Retrieved from http://www.faqs.org/rfcs/rfc821.html on May 11, 2005.*

Motgi et al. "Network Conscious Text Compression System (NCTCSys)" University of Central Florida. Retrieved from vlsi.cs.ucf.edu/datacomp/papers/finalpaper.doc on May 10, 2005.*

* cited by examiner

METHOD AND APPARATUS FOR MANAGING AND COMPACTING ELECTRONIC MAIL MESSAGES

BACKGROUND

1. Field of the Invention

The present invention relates to the transmission of electronic messages over computer networks, and more particularly, to a method and apparatus for managing and manipulating a plurality of electronic messages on the basis of predetermined criteria.

2. Background of the Invention

During the past decade, electronic mail ("e-mail") has become an indispensable tool for facilitating business and personal communications. Through computer networking systems such as local-area networks ("LAN"), wide-area networks ("WAN"), and the world-wide web ("WWW"), network users can send and receive notes, letters, documents and other messages to communicate with others who are in the same office or in remote locations across the world.

E-mail application programs typically comprise client-server applications. That is, a mail server application ("mail server"), running on a server computer, provides centralized e-mail services for multiple users. The mail server application coordinates with other mail servers running on the network to send and receive e-mail messages composed by or addressed to local users. Any suitable protocol, for example, Simple Mail Transfer Protocol ("SMTP"), can be used to coordinate different mail server applications. Typically e-mail messages (inbound, outbound and in some cases, even "draft" e-mail messages) are stored by the mail server in "mailboxes" assigned to each user. These mailboxes typically comprise one or more files or directories (also known as folders) on a physical storage medium, e.g., a hard disk on the server computer.

Users typically use a client application running on a local computer to retrieve their e-mail messages from the mail server. As known in the art, client applications communicate with mail server applications using any suitable protocol (e.g., Post Office Protocol ("POP" or "POP3") or Internet Message Access Protocol ("IMAP" or "IMAP4")). Generally, e-mail messages are created, viewed and/or managed using the client application. That is, the client application must be opened (i.e., executed) on the client computer to access the e-mail messages.

After downloading a user's e-mail messages from the user's mail server, the mail server application may be instructed to automatically delete the message from the user's mailbox on the server. Alternatively, a copy of the message may be retained on the server for later access. In either case, after retrieving the e-mail messages, the user may read the messages on the local computer even if the server computer is no longer accessible.

E-mail service providers typically limit the amount of physical storage space available for each customer. Such limits are typically used to ensure adequate storage space is available for other users, and in some cases are necessary to ensure adequate operational efficiency of the mail server. Implementation of such limits typically include restrictions on the aggregate file size for all e-mail messages in a particular user's mailbox. In some cases, e-mail service providers limit the total number of e-mail messages stored by a user on the server. Because of such limits, e-mail users face the recurring problem of meeting or exceeding the storage space limits imposed by their e-mail service providers. E-mail service provider policies may vary with respect to the consequences of exceeding the allotted storage space. For example, the service provider may prevent additional e-mail from being sent or received by the user until the amount of storage space is reduced, or the service provider may assess additional charges on the user for each message or storage space unit over the limit. Regardless of the policy employed, the inconvenience or additional costs imposed on a user can be severe.

To overcome these limits, users typically delete e-mail messages from the server after downloading them to the local computer. However, this approach results in other problems or inconveniences for many users. For example, if a user accidentally deletes one or more messages from the local computer, and the local computer system has not been backed up, important e-mail messages may be permanently lost. Additionally, some e-mail users do not have a dedicated local computer for downloading and saving e-mail messages. Such users may access their e-mail from shared access computers or from public access terminals. For these users, the mail server may be the only permanent storage location available. Finally, if e-mail messages are maintained on the mail server, the messages are available to the user from any client application running on the network. Accordingly, e-mail users need the capability to store and manage e-mail messages on the mail server not withstanding the limits on mail server storage facilities.

Downloading and storing e-mail messages on a local computer may solve the problems described above as they relate to the e-mail server application and host computer. However, many of the same problems could arise with respect to the user's client application and local computer system. For example, the local computer may have only a limited amount of storage space, or the client application may experience performance problems if the user's local mailbox is too large. Generally, the user's mailbox size will be proportional to the number of e-mail messages in the mailbox and the aggregate message size of the items within. Accordingly, a need exists for methods and systems for managing and compacting e-mail messages stored on a local computer system.

To compound the problem, e-mail messages typically comprise one or more attached files, greatly increasing the size of the e-mail messages. Users typically export (i.e., save) e-mail messages and or attachments to a location external to the client application and files. Once an e-mail message or attachment has been exported, it may be viewed or managed using other suitable application programs. The problem with exporting e-mail messages and attachments is that users lose the inherent ability of the e-mail client application to manage e-mail messages in the form they were received. For example, e-mail messages associated with a recurring subject (also known as "threads") may not be readily viewed external to the e-mail client. Similarly, if an attachment is separated from the e-mail message, it becomes more difficult to locate the attachment and to determine when it was sent or received and who the sender or recipient was for the document. Accordingly, e-mail users need the capability to store and manage e-mail messages on local computers without losing the beneficial features of the mail client application.

Current e-mail server and client applications do not provide efficient tools for users to effectively manage the size or number of e-mail messages. E-mail client and server applications typically allow users to sort e-mail messages by date, subject, or the sender or receiver's name. However, such applications do not allow the user to sort or screen e-mail messages by size, and they do not provide the capability to compact e-mail messages or attachments for future access within the e-mail application. A need therefore exists for the capability for e-mail users to manage the size of e-mail messages whether stored on a mail server or on a client computer system.

SUMMARY OF THE INVENTION

The present invention is a method and apparatus for managing and compacting, i.e., reducing the size of, electronic mail messages stored on a server computer, on a client computer or on both a server and a client computer. The method and apparatus can be implemented on a server-wide basis wherein every e-mail message on the server is checked against a predetermined criteria to determine if compacting is required. In this embodiment, every e-mail message, including inbound and outbound messages to or from every user on the mail server system, is screened for such compacting. Alternatively, individual e-mail users may implement customized compacting procedures on the mail server or on their respective client computer systems.

Compacting procedures for e-mail messages include compressing the e-mail message, compressing any e-mail attachments, compressing both the e-mail message and any e-mail attachments, or detaching e-mail attachments from the message. If the e-mail attachments are detached from an e-mail message, the detached files may be stored in a location external to the e-mail application and an index is inserted in the message for future reference.

The predetermined criteria used to screen e-mail messages may comprise a threshold limit on the total size of an individual e-mail message, without or with attachments, the total size of all attachments to a single e-mail, or the individual size of any one attachment in an e-mail message. Alternatively, the criteria could be based on whether or not an e-mail message comprises any attachments at all, the number of attachments to an individual e-mail message, the expected compression ratio for the e-mail message or attachments, or the file-type of any attachments. In an alternative embodiment, the predetermined criteria comprises a message subject, a sender's name, or some other identifiable message attribute.

It is an object of the present invention to provide e-mail users with a system and method for managing and compacting their e-mail messages to conserve storage space on an e-mail host or local computer system.

It is another object of the present invention to provide e-mail system administrators with tools to more effectively manage e-mail services.

It is another object of the present invention to automate screening of e-mail messages to identify e-mail messages requiring compacting.

It is another object of the present invention to automate compacting procedures for e-mail server and/or e-mail client systems.

It is another object of the present invention manage e-mail attachments external to an e-mail server or client application by separating the attachments from the messages and inserting links indicating the addresses of any attachments so separated.

These and other objects of the present invention are described in greater detail in the detailed description of the invention, the appended drawings and the attached claims.

DETAILED DESCRIPTION OF THE INVENTION

Figure 1A:
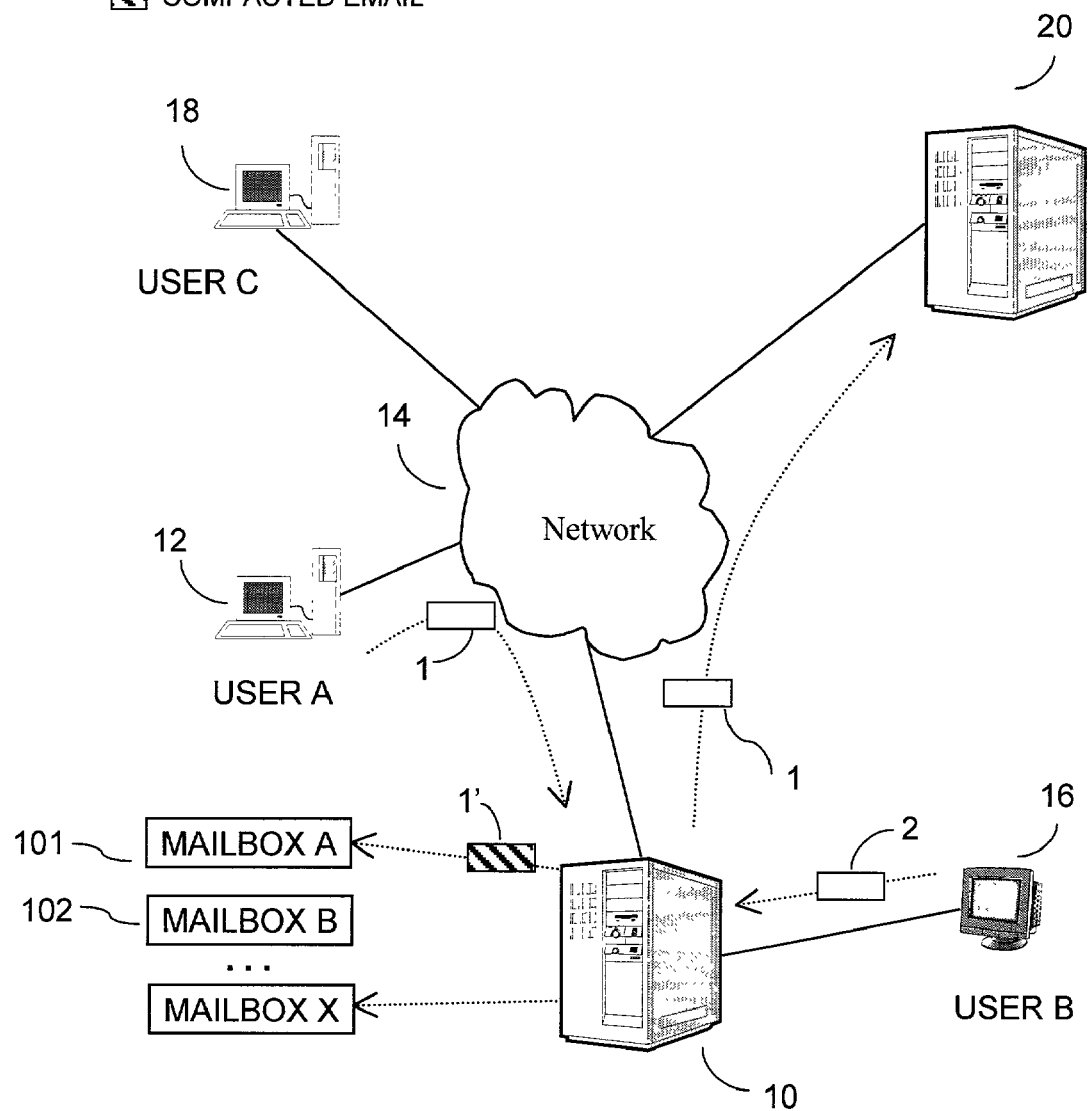
FIGS. 1A-1C are schematic diagrams showing the message flow in an e-mail system according to an embodiment of the present invention.

FIG. 1A shows a typical network architecture used in an embodiment of the present invention. FIG. 1A shows how three users (Users A-C) send and receive e-mail via associated client computers or terminal interfaces and e-mail server systems. As shown in FIG. 1A, host 10 is an e-mail server system comprising one or more electronic mailboxes assigned to one or more users. In FIG. 1A host 10 has an e-mail server application providing e-mail service for users A and B. User A has a client application, running on computer 12, for sending and receiving e-mail via the e-mail server application on host 10. As shown in FIG. 1A, computer 12 communicates with host 10 via network 14. User B uses terminal 16, directly connected to host 10, to send and receive e-mail messages via the server application on host 10. User B may use a client application running on server 10, or if User B has sufficient skill and system privileges, User B could interface directly with the server application on host 10. The third user shown in FIG. 1A, User C, has computer 18 and subscribes to e-mail services provided through host 20.

In a first embodiment of the present invention, an e-mail system administrator may implement server-wide criteria for managing and compacting e-mail messages processed by the server. In this embodiment, all e-mail messages processed by a server, e.g., host 10, are screened against some predetermined criteria. The administrator may also define exceptions to the screening criteria and compacting procedures to handle special cases. For example, the administrator may choose to exempt those users willing to pay for unlimited storage space.

In this embodiment, the system administrator for host 10 may implement a screening criteria to identify all e-mail messages greater than 500K bytes. In this example, assume that the administrator's compacting procedures directs the system to process (i.e., mail out) any messages exceeding the size limit, but compacts such e-mail messages prior to storing them in a user's mailbox. Accordingly, outbound messages (i.e., from a user served by host 10) are transmitted before any automatic compacting procedures are performed. However, all messages, including both inbound and outbound messages, are compacted prior to their being stored on host 10. For example, if user A sends uncompacted e-mail message 1 to user C, the message first travels from computer 12 to host 10. When host 10 receives uncompacted message 1, the e-mail server application tests the message against the screen criteria. In this example, uncompacted e-mail message 1 is 800K bytes, and so the message will be processed according to the system administrator's compacting procedures.

The server application on host 10 receives uncompacted e-mail message 1 and sends it on to host 20 as uncompacted e-mail message 1, as shown in FIG. 1A. The server application then compacts e-mail message 1 into compacted e-mail message 1' which is stored in user A's mailbox (Mailbox A) 101 on host 10. Conversely, when User A wishes to read compacted e-mail message 1' the server application temporarily uncompacts the message and sends the uncompacted message to User A on computer 12 through network 14.

Figure 1B:
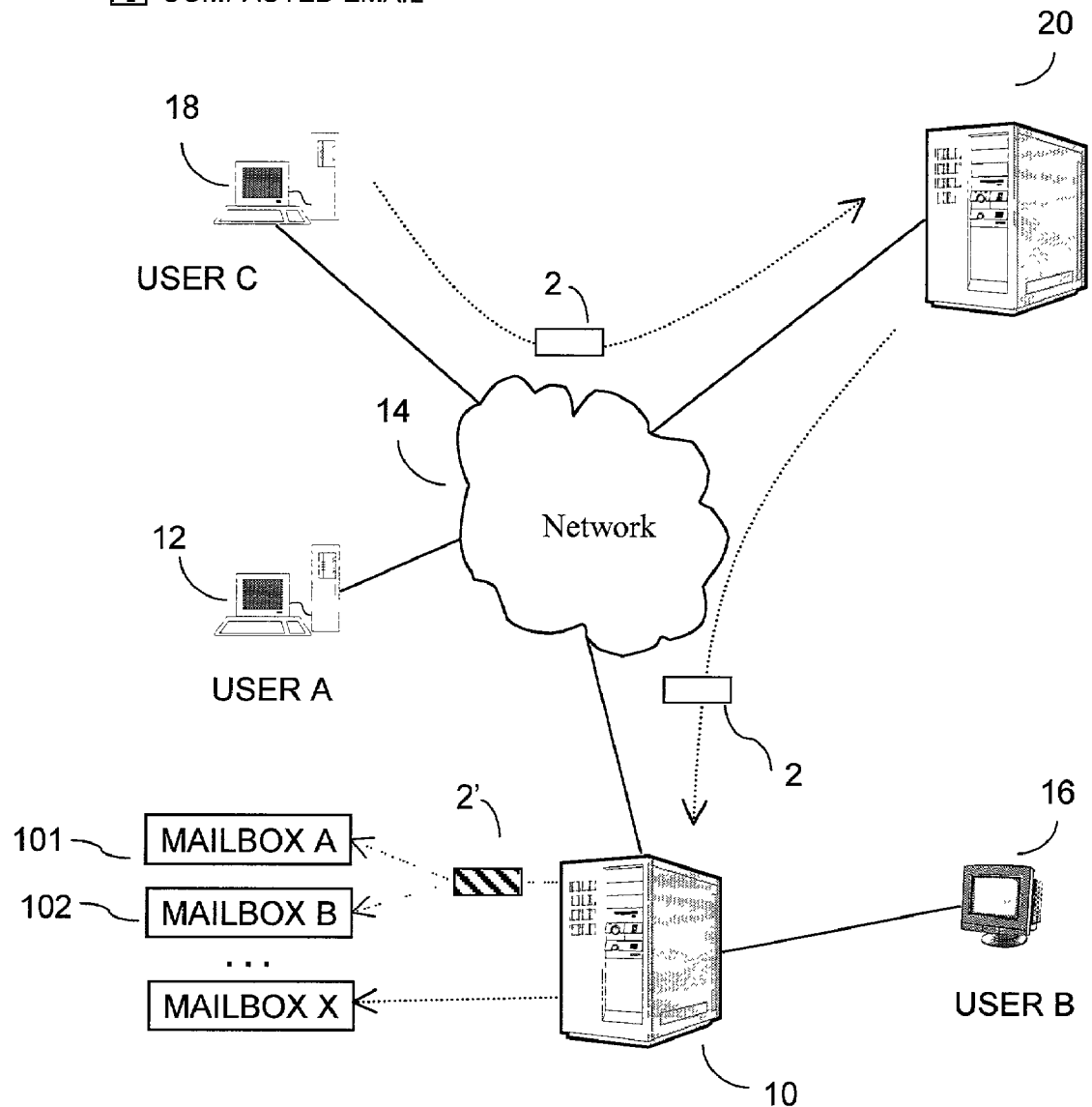

Continuing in this example, if User C sends either User A or User B an e-mail message larger than 500K bytes, the message will be compacted automatically before being stored in the users' respective mailboxes, as shown in FIG. 1B. In FIG. 1B, User C sends uncompacted message 2 to Users A and B. Uncompacted message 2 flows through host 20 to host 10. The server application on host 10 checks uncompacted message 2 to determine if it requires compaction. If so, compacted message 2' is stored in User A and User C's mailboxes 101 and 102, respectively. In an alternative embodiment, the server application may wait until the user has read his or her inbound e-mail messages and compact them only if the user decides to save the message for later use.

Figure 1C:
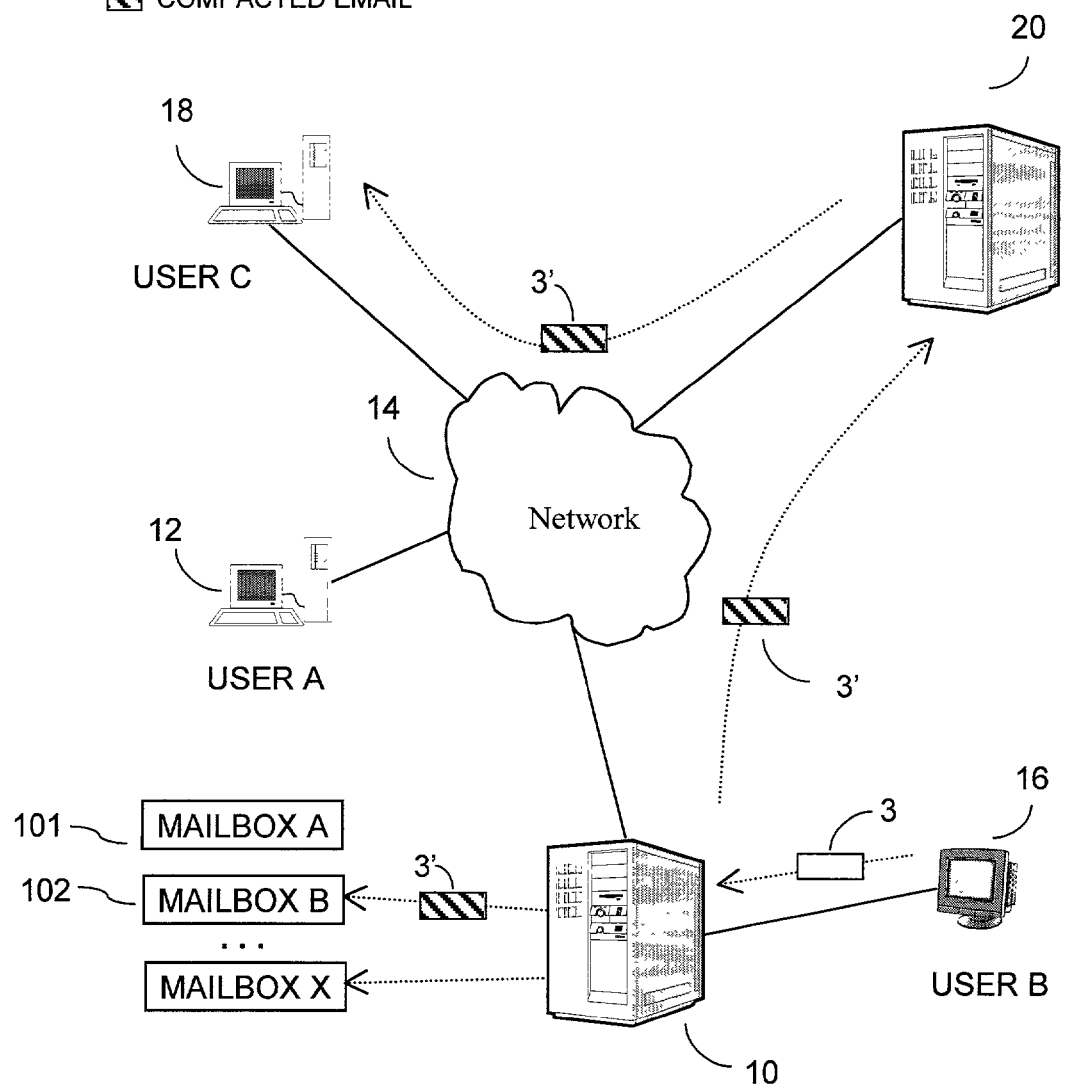

In another example, shown in FIG. 1C, the system administrator of host 10 may mandate that all e-mail messages exceeding the 500K byte threshold are to be compacted prior to sending them out to other hosts. In this case, when User B sends 1.2 M byte uncompacted e-mail message 2 to User C, the server application applies the screening criteria as described above. Since the message meets the screening criteria, the server application compacts the message prior to sending it on to User C (via host 20). As shown in FIG. 1C, uncompacted e-mail message 3 becomes compacted e-mail message 3' which is then stored in Mailbox B 102 and sent to host 20 for delivery to User C.

In an alternative embodiment, the server application may be configured to provide individual users with the capability to define their own screening criteria and compacting procedures to be followed on the server. In this embodiment, users may tailor the system according to their own specific requirements for managing and compacting their e-mail on the host system. Such customized settings may even be implemented as a supplement to the server-wide processing discussed above. User settings may be transmitted to the server application in any suitable manner. For example, the user may send an e-mail directly to the system or to the system administrator for processing. Alternatively, a graphical user interface ("GUI") may be provided for managing the user's account on the host computer. Such GUI interface could be accessible via the world-wide web or other network interface.

In another alternative embodiment, a user can manage and compact e-mail messages stored on the user's local computer by implementing screening criteria and processing procedures to be followed by the e-mail client application. As described above, users often download e-mail from a server to a local computer. Limitations in available storage space on the user's local computer and performance problems can result from storing numerous large e-mail messages or message attachments for management within the e-mail client application. The e-mail client application may be modified to provide automated message processing according to the present invention.

Compacting procedures for e-mail messages may be implemented using conventional methods such as compressing the e-mail message, e-mail attachments, or both the message and attachments. Compacting procedures could also be implemented by detaching e-mail attachments from the message, and replacing the attachment with an index for retrieving the attachment at a later date. The attachment may be exported or saved on a storage device on the local computer or could be saved on a different computer and storage device reachable via a network including, e.g., the world-wide web. In a preferred embodiment, the index comprises a universal resource locator ("URL") pointing to the address of the attachments. The e-mail client application may be configured to automatically save the attachment in either uncompressed or compressed format. Similarly, the e-mail client application may be configured to automatically decompress attachments when the user selects the index (or URL link) for viewing the attachment.

Figure 2:
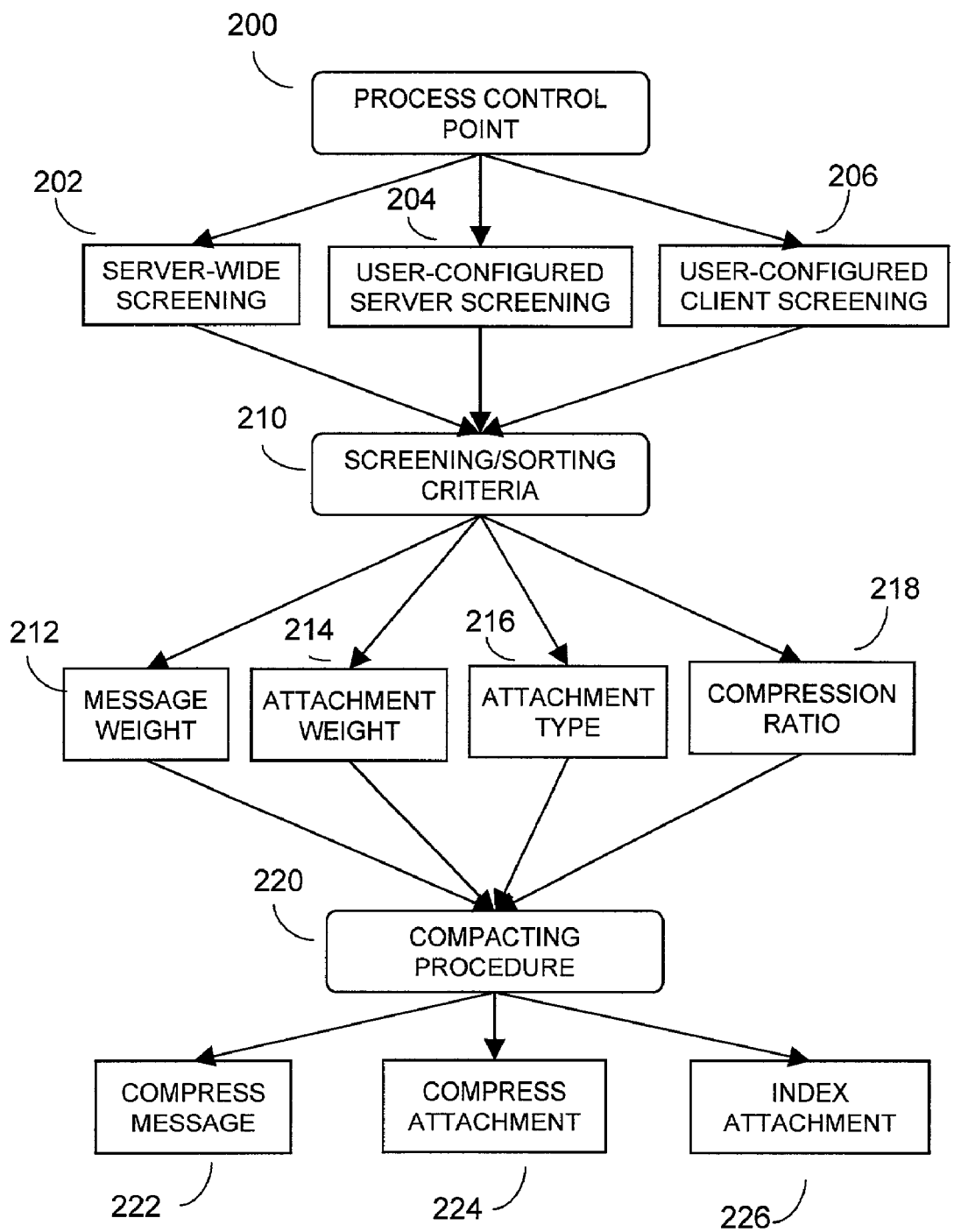
FIG. 2 is a message flow diagram showing the overall architecture and options used in an embodiment of the present invention.

The message flow diagram in FIG. 2 illustrates the steps used in an embodiment of the present invention. Although FIG. 2 shows multiple branches in the process, it is to be understood that a user or system administrator may implement more than one branch concurrently. At process control point 200 the overall system architecture for implementing the present invention is selected. As shown in FIG. 2, the e-mail system administrator may implement server-wide screening 202, or the user may implement screening procedures on the server (step 204) or screening procedures on the client (step 206). In step 210, the screening criteria is selected. As noted in FIG. 2, the criteria could also be used to determine how e-mail is sorted for viewing by the users. As shown in FIG. 2, the screening/sorting criteria may comprise message weight 212, attachment weight 214, attachment type 216 or compression ratio 218. Message weight 212 and attachment weight 214 use the size of the message or message attachments to determine if the e-mail should be processed according to the present invention. Similarly, attachment type 216 examines the file format of the attachments to make the determination. For example, if the attachment is a "zipped file," i.e., it is already compressed, the message may not require or be capable of further compacting procedures. Compression ratio 218 is used if the criteria seeks to measure the expected benefit of processing e-mail messages according to the present invention.

If a message meets the screening criteria, then the process moves on to compacting procedures 220. As shown in FIG. 2, the e-mail message may be compressed in step 222, the attachment may be compressed in step 224, or the attachment may be removed and indexed in steps 226. Any combination of these compacting procedures may be implemented as described above.

Figure 3:
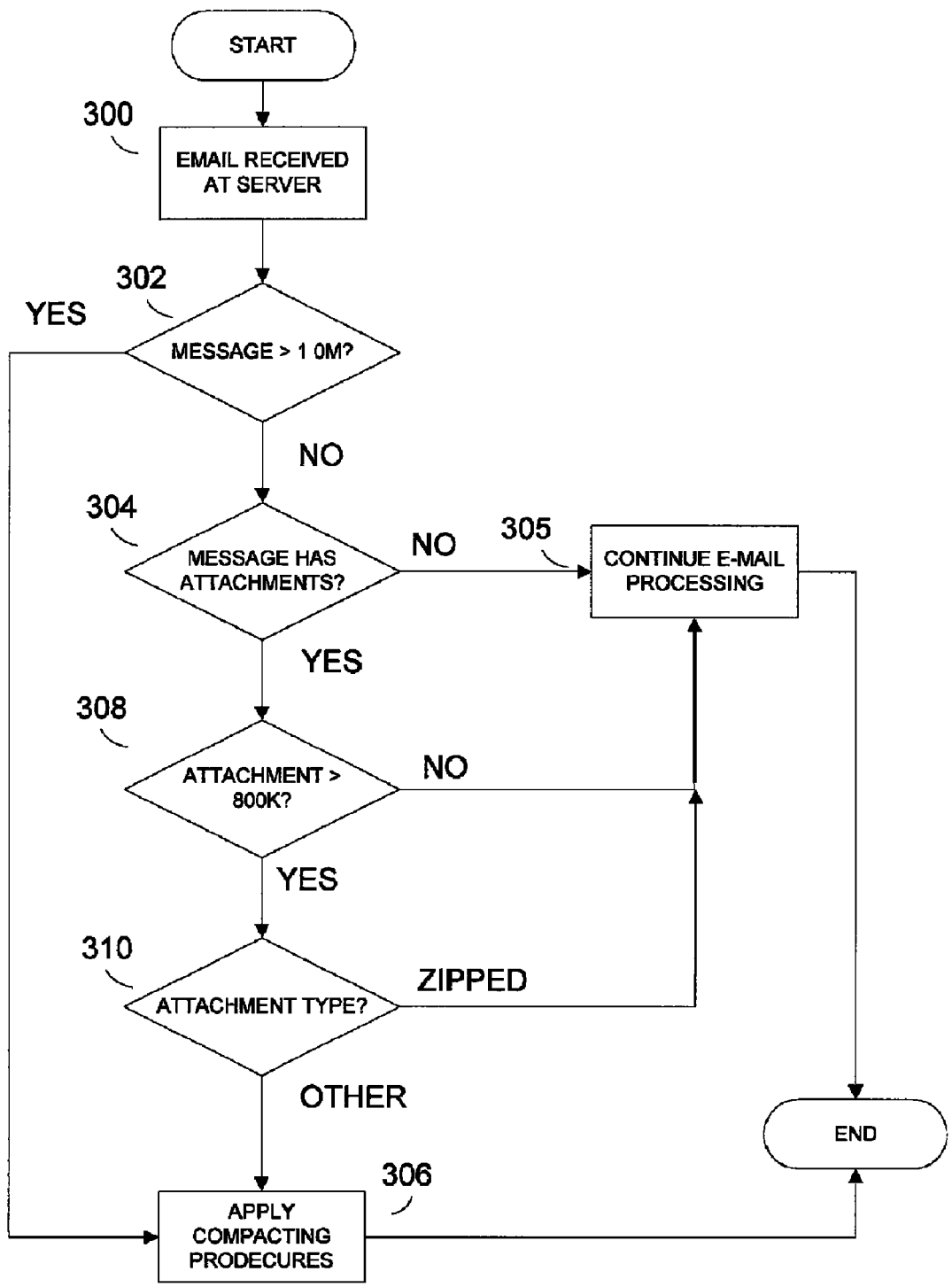
FIG. 3 is a flow diagram showing some of the steps performed in a preferred embodiment of the present invention.

In the example described in FIG. 3, the system administrator has configured the server application to screen messages having an overall size greater than one megabyte ("1.0M") or those having attachments greater than 800K in size. As shown in FIG. 3, the process starts in step 300 when an email message is received by the server. In step 302 the server checks the incoming message to determine the next step. If the message is not greater than 1.0M, the process moves on to step 304 where the message is checked for attachments. If the message is greater than 1.0M, the process moves on to step 306 where the compacting procedures are followed.

If in step 304 the message has no attachments, the process is complete and the email server application continues normal message processing. For example, if the incoming message was a message addressed to a user served by that email server, the message is stored in the user's mailbox. On the other hand, if the message is addressed to external users (i.e., users served by different servers) it is sent on without any further intervention by the present invention in step 305. If in step 304, the message has attachments, the process moves on to step 308 where the individual attachments size is checked. As shown in FIG. 3, if any attachments are greater than 800K, the process moves on to step 310. Otherwise, if none of the attachments satisfy the criteria, the process ends with step 305, as described above. In step 310, for attachments exceeding the 800K screening criteria, the attachment type is checked. If in step 310 an attachment is "zipped" the attachment is already compressed. In this situation, there is no need for further compacting of the message and the process ends with step 305. Note that if there are multiple attachments exceeding the size criteria, the server application will perform step 310 for each such attachment before moving on to step 305. In the present example, the attachments are only checked for those already zipped when they are received. Other attachment types could be defined for specific compacting procedures. In this case, in step 305 would include checking for each defined attachment type to determine the next step. In step 305 of the present example, if an attachment is not zipped, the process moves on to step 306 where compacting procedures are applied.

In another embodiment of the present invention, e-mail messages are checked or screened against the predetermined criteria on a periodic basis rather than every time a message is received at the server. This embodiment may be preferable if there are performance concerns for the e-mail server application. The system administrator could setup a nightly routine for checking all e-mail stored in users' mailboxes for those messages satisfying the criteria. Any messages meeting the criteria are then processed according to the compacting procedures as described above.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

I claim:

1. A method for automatically managing an electronic mail server application on a host computer, comprising:
    checking an electronic mail message against a predetermined criteria;
    determining whether the message has been previously compressed;
    compacting a non-attachment portion of the electronic mail message if the predetermined criteria is satisfied and if the message has not been previously compressed; and
    storing the compacted electronic mail message.

2. The method of claim 1, wherein the checking is performed when the electronic mail message is received by the electronic mail server application.

3. The method of claim 1, wherein the checking is performed periodically on the host computer.

4. The method of claim 1, wherein the predetermined criteria comprises a total message size.

5. The method of claim 1, wherein the predetermined criteria comprises an attachment size.

6. The method of claim 1, wherein the predetermined criteria comprises an attachment type.

7. The method of claim 1, further comprising compressing the attachment.

8. The method of claim 1, further comprising decompacting the compacted electronic mail message for retrieval.

9. A method for managing a user's electronic mailbox on a computer, comprising:
    performing an off-peak hours routine for checking an electronic mail message against a predetermined criteria;
    determining if the electronic mail message has been previously compressed;
    compressing a non-attachment portion of the electronic mail message if the predetermined criteria is satisfied, wherein compressing the electronic mail message is performed by searching for repeated patterns in the electronic mail message and encoding those patterns; and
    storing the compressed electronic mail message.

10. The method of claim 9, wherein the checking is performed when the electronic mail message is received by the electronic mailbox.

11. The method of claim 9, wherein the checking is performed upon request by the user.

12. The method of claim 9, wherein the predetermined criteria comprises a total message size.

13. The method of claim 9, wherein the predetermined criteria comprises an attachment size.

14. The method of claim 9, wherein the predetermined criteria comprises an attachment type.

15. The method of claim 9, wherein the location of the searching of the message is on a server.

16. The method of claim 9, wherein the location of the searching of the message is on a client.

17. The method of claim 9, wherein the location of the searching of the message is configured by a user.

18. The method of claim 9, wherein the searching is performed periodically on the computer.

19. The method of claim 9, wherein the electronic mail message is compressed into a zipped file.

20. The method of claim 9, further comprising decompressing the compressed electronic mail message for retrieval.

21. A non-transitory computer readable medium with logic embedded therein for executing on a computer for managing a electronic mailbox on a computer comprising:
    logic configured to perform an off-peak hours routine to screen an electronic mail message against a predetermined criteria;
    logic configured to determine if the message has been previously compressed;
    logic configured to, if the predetermined criteria is satisfied, compress the electronic mail message by finding repeated patterns in the message and encoding those patterns; and
    logic for storing the compressed electronic mail message.

22. The non-transitory computer readable medium of claim 21, further comprising logic configured to screen when the electronic mail message is received by the electronic mailbox.

23. The non-transitory computer readable medium of claim 21, further comprising logic configured to screen upon request by the user.

24. The non-transitory computer readable medium of claim 21, further comprising logic configured to screen periodically.

25. The non-transitory computer readable medium of claim 21, wherein the predetermined criteria comprises a total message size.

26. The non-transitory computer readable medium of claim 21, wherein the predetermined criteria comprises an attachment size.

27. The non-transitory computer readable medium of claim 21, wherein the predetermined criteria comprises an attachment type.

28. The non-transitory computer readable medium of claim 21, wherein the electronic mail message is compressed into a zipped file.

29. The non-transitory computer readable medium of claim 21, further comprising logic for decompressing the compressed electronic mail message for retrieval.

* * * * *